Jan. 14, 1969     C. H. WARMAN     3,421,652
FLUID TIGHT JOINT

Filed Aug. 3, 1964

Jan. 14, 1969  C. H. WARMAN  3,421,652
FLUID TIGHT JOINT

Filed Aug. 5, 1964  Sheet 3 of 3

Charles H. Warman
Inventor

By Wenderoth, Lind and Ponack
Attorneys

United States Patent Office 3,421,652
Patented Jan. 14, 1969

3,421,652
FLUID TIGHT JOINT
Charles H. Warman, Castlecrag, New South Wales, Australia, assignor to Research and Development Pty. Ltd., Perth, Western Australia, Australia, a corporation of Western Australia, Australia
Filed Aug. 3, 1964, Ser. No. 387,034
Claims priority, application Australia, Aug. 9, 1963, 34,054/63
U.S. Cl. 220—46          6 Claims
Int. Cl. B65d 43/00

ABSTRACT OF THE DISCLOSURE

A fluid tight connection between two casing members of centrifugal pumps and the like which casing members have an axis, said connection comprising; an outwardly directed flange around each of said members so as to lie in side-by-side relationship, each said flanges having an annular clamping face on the side thereof remote from the flange on the other flanged member with said clamping faces being coaxial and convergent outwardly from the axis of the connected members, an annular tapered loading face on one said member engaging a corresponding opposing loading face on the other member to thereby positively align and locate said members, said annular tapered loading faces being provided on sections of said members which extend in the axial direction from said flanges, and which are spaced from said clamping faces, said side-by-side flanges defining an annular space between them and positioned between said loading faces and said clamping faces, a resilient joint ring compressed within said annular space, a clamping ring subdivided into two or more separated segments and having an inwardly facing annular groove with the sides thereof having annular faces matching the clamping faces on said flanges, said clamping ring being arranged with its sides straddling the two flanges and encircling said members, and tangential bolts connecting said separated segments and contracting said clamping ring to thereby maintain said members in fluid tight relationship by means of the axial force exerted on the clamping faces of said flanges by the matching faces in said annular groove.

This invention relates to fluid tight joints between tubular members or between tubular and cover type members or between body and cover type members.

One object of the invention is to provide a joint in which the joint bolts do not directly bear the load tending to part the joint so that a minimum number of bolts may be used and the joints may be readily made and broken even when the members joined are of large dimension and the load is very great such as, for instance, the joint between the body and cover members of large centrifugal pumps. Another object is to provide a method of forming a joint suitable for use with members constructed from brittle materials in which bolt holes are difficult to drill, lugs are of insufficient strength and joint faces are difficult to machine. Still another object is to provide a method which permits sealing despite considerable surface irregularity of the joint faces. A further object is to provide a method in which the fluid pressure differential across the joint acts to increase the sealing pressure of the jointing material against the joint faces on the joined members. Features of the invention are that the method provides coaxial and relative axial location of the members and permits them to be joined in any relative angular position about the axis of the joint.

Basically the invention comprises a fluid tight joint between at least two members, wherein each of two of the members to be jointed is provided with a flange having an annular clamping face on the side thereof remote from the flange on the other flanged member, said annular clamping faces being coaxial and convergent outwardly from the axis, an annular tapered loading face being provided on at least one of said flanged members with a corresponding opposing loading face being provided on another of the members to be jointed, and wherein a clamping ring subdivided into two or more separated segments connected by tangential bolts and having an inwardly facing annular groove with the sides thereof having annular faces matching the clamping faces on the flanges is placed about said flanges, and said bolts are thereafter tightened to draw said segments toward one another circumferentially about said flanges whereby the faces in said annular groove engage and exert axial force on the clamping faces of said flanges to draw said flanged members toward each other, the movement of said flanged members bringing said tapered loading faces into engagement to thereby positively align and locate the members with respect to each other and simultaneously compressing a resilient joint ring enclosed within an annular space or recess between said members. The greater the convergence of the engaging surfaces of the clamping ring segments and the flanges the greater, for a given tightening of the clamping ring bolts, is the movement of the flanges towards each other for compression or deformation of the joint ring, however the convergence cannot exceed that at which frictional forces between the surfaces would prevent the drawing together of the clamping ring segments. The smaller the convergence of the engaging surfaces the smaller the load from the joint taken by the clamping ring bolts but the smaller also is the approaching movement of the flanges for a given tightening of the bolts. It has been found in practice that an angle of convergence of between 15 and 30 degrees is suitable permitting the use of smooth but unmachined cast surfaces for the converging and jointing faces.

The joint ring of any suitable resilient deformable jointing material, and either of round or of any other suitable cross-section, may be contained in a shaped annular space or recess formed by and between the jointed members and so arranged as to reduce in cross-sectional area and to deform the joint ring to provide sealing contact therewith as the members are drawn towards each other by the clamping ring segments. The cross-sectional shape of the annular space or recess may be triangular or wedge like such that fluid pressure acting on the joint ring and tending to cause fluid to pass between the joint ring and the jointed members forces the joint ring more tightly into the downstream apex of the recess thus sealing the joint against leakage.

In a variant form of the invention each of the two flanged members is provided with an annular loading face at least one of which is tapered, which, as the members are drawn toward each other, engages and exerts force on a corresponding opposing face on a third member whereby said third member is positioned and clamped. The joint ring in this form of the invention is contained in a shaped annular space or recess formed by and between all three said members and so arranged as to reduce in cross-sectional area and to deform the joint ring by contact with the members as they are drawn toward one another by the clamping ring segments.

In order that the annular sidewall faces of the groove in the clamping ring segments may bear evenly throughout their circumferential length on the flanged members as the segments move inwards and the members are drawn together by the segments from a position where the outer peripheral edges of the clamping faces on the members first engage with the inner edges of the side wall faces of the groove, the curvature of said inner edges of said side wall faces may be made substantially the same as the curvature of the peripheries of the clamping faces on the flanges of the members, the curvature of the clamping ring segments increasing by elastic deformation to maintain substantially uniform pressure throughout the increasing areas of engagement of said segments with said flanges as the clamping ring bolts are tightened. To permit the clamping ring segments to change their curvature easily by elastic deformation circumferentially and yet have a high rigidity to resist the opening out of the groove by the axial parting load on the joint, the sides of the segments may be slotted radially or formed discontinuously to reduce the moment of resistance to bending of the segments in a radial plane.

Some specific forms of the invention are illustrated in the accompanying drawings, wherein.

Like parts are illustrated by like characters throughout the specification and drawings.

Figure 1:
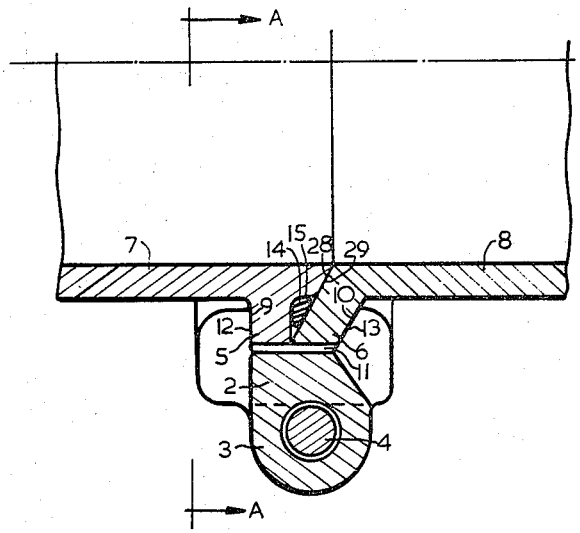
FIG. 1 is a part axial section of a joint between two tubular members.

As shown in the drawings a clamping ring 1 is subdivided into four similar separated segments 2 provided with bosses 3 for connecting bolts 4 adapted to draw the segments towards one another circumferentially about two adjacent flanges 5 and 6 formed on the members 7 and 8 respectively, between which members the joint is to be made. The flanges 5 and 6 are provided with the annular clamping faces 9 and 10, respectively, these faces being co-axial and convergent outwardly from the axis. The flanges are adapted to enter an inwardly facing annular groove 11 in the clamping ring segments 2, said annular groove having sides with annular faces 12 and 13 which match the flange clamping faces 9 and 10 respectively, and are adapted to engage and exert axial force on said clamping faces to draw the flanges towards each other axially as the clamping ring segments are drawn toward one another circumferentially by tightening the clamping ring connecting bolts 4. As the flanged members are drawn together, tapered loading faces 28 and 29 engage each other to positively align and locate members 7 and 8 with respect to one another.

Figure 6:
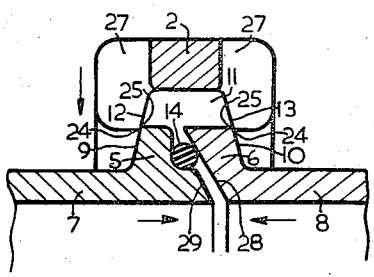
FIG. 6 is a fragmentary section on the line B—B of FIG. 5.

A joint ring 14, initially of circular cross-section, of any suitable resilient deformable material is contained in a triangular or wedge shaped space or recess 15 formed by and between the members 7 and 8, said space or recess reducing in cross-sectional area and deforming the joint ring to form a seal between the members as they approach each other in the manner illustrated in FIG. 6.

Figure 2:
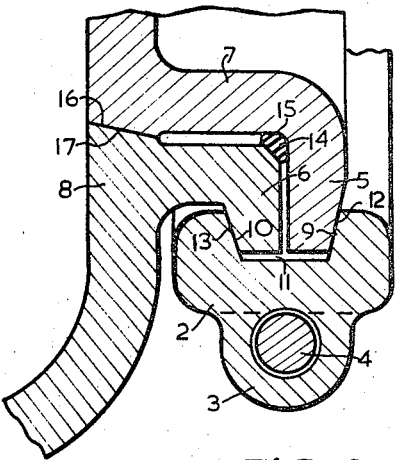
FIG. 2 is a part axial section of a joint between a body type and a cover type member.

In the form of the joint shown in FIG. 2 the member 7 is provided with a machined or smoothly and accurately cast tapered annular loading face 16 which engages the matching tapered annular loading face 17 in the member 8 thereby positively aligning and locating the said members when they are drawn together.

Figure 3:
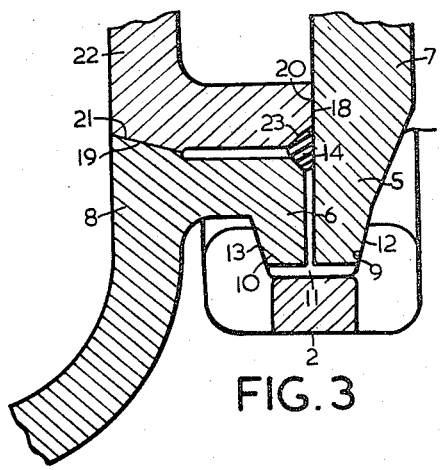
FIG. 3 is a part axial section of a joint between three members.
Figure 4:
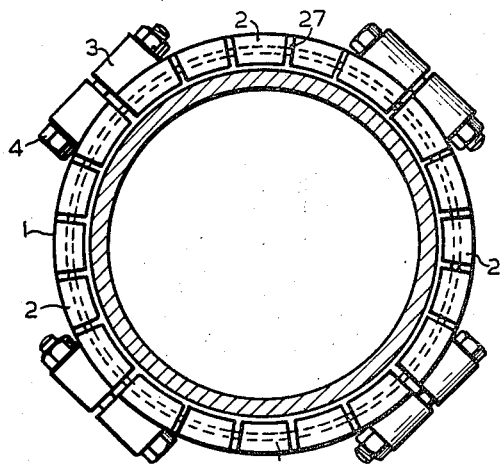
FIG. 4 is an elevation on the line A—A of FIG. 1.

FIG. 3 shows a variant form of the invention as depicted in FIG. 2 whereby the flanged member 7 in FIG. 2 is replaced by two separate members 7 and 22. Each of the flanged members 7 and 8 is provided with an annular loading face, as at 18 and 19 respectively, which engage corresponding opposing faces 20 and 21 respectively on a third member 22, whereby said third member is positioned and clamped when the members 7 and 8 are drawn towards each other. The joint ring 14 is compressed or deformed in the triangular space or recess 23 formed by and between all three said members.

Figure 5:
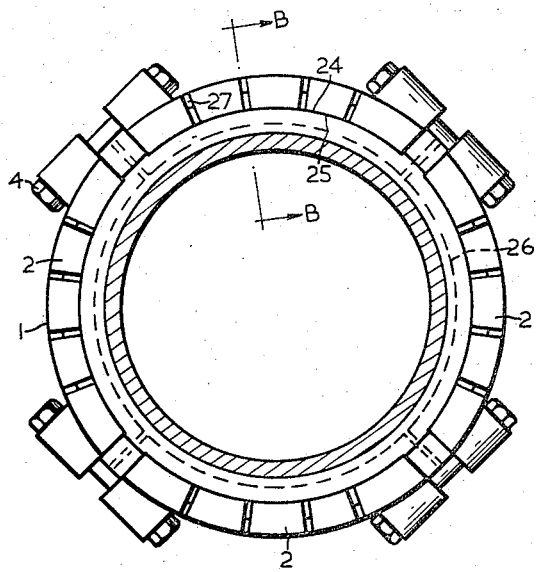
FIG. 5 is an elevation showing a joint in the course of assembly.

In the joint shown in the course of assembly in FIGS. 5 and 6 the curvature of the inner edges 24 of the clamping ring segments 2 is, before tightening the connecting bolts 4, substantially the same as the curvature of the peripheries 25 of the clamping faces 9 and 10 on the flanged members. As the connecting bolts 4 are tightened the clamping ring segments 2 move inwards and when the flanged members have reached their final position and the joint is made, the inner edges 24 of the clamping ring segments have the position and increased curvature indicated by the broken line 26 in FIG. 5.

In the forms of the joint as shown in FIGS. 1, 3, 4, 5 and 6 the sides of the clamping ring segments 2 are interrupted by radial slots 27 which reduce the moment of resistance to bending of the segments in a radial plane and allow them to more easily change their curvature as they are drawn inwards by the clamping ring connecting bolts 4.

The convergence of the clamping faces 9 and 10 may, with respect to a plane normal to the axis of the joint, be otherwise than equally shared. Thus as shown in FIG. 1 the clamping face 9 is parallel to a plane normal to the axis of the joint and the entire convergence is provided by the clamping face 10. When the convergence of the clamping faces is not equally shared it is an advantage to locate the centre lines of the clamping ring segment connecting bolts 4 asymmetrically towards that side of the clamping ring with the face having the greater convergence and ideally, as shown in FIG. 1, the bolt centre lines should lie in that plane normal to the axis of the joint which contains the resultant of the forces acting between the contacting faces of the flanged members and the clamping ring segments.

While the members to be jointed by the method described will in general be of circular form and the jointing and clamping faces likewise, the method is equally applicable to non-circular members such as for instance tubular, cover and body type members of elliptical shape.

I claim:

1. A fluid tight connection between two casing members of centrifugal pumps and the like which casing members have an axis, said connection comprising; an outwardly directed flange around each of said members so as to lie in side-by-side relationship, each said flange having an annular clamping face on the side thereof remote from the flange on the other flanged member with said clamping faces being coaxial and convergent outwardly from the axis of the connected members, an annular tapered loading face on one said member engaging a corresponding opposing loading face on the other member to thereby positively align and locate said members, said annular tapered loading faces being provided on sections of said members which extend in the axial direction from said flanges, and which are spaced from said clamping faces, said side-by-side flanges defining an annular space between them and positioned between said loading faces and said clamping faces, a resilient joint ring compressed within said annular space, a clamping ring subdivided into two or more separated segments and having an inwardly facing annular groove with the sides thereof having annular faces matching the clamping faces on said flanges, said clamping ring being arranged with its sides straddling the two flanges and encircling said members, and tangential bolts connecting said separated segments and contracting said clamping ring to thereby maintain said members in fluid tight relationship by means of the axial force exerted on the clamping faces of said flanges by the matching faces in said annular grooves.

2. A fluid tight connection as claimed in claim 1, wherein the sides of said clamping ring segments have recesses therein thereby increasing the circumferential flexibility of said segments.

3. A fluid tight connection between three casing members of centrifugal pumps and the like which casing members have an axis, said connection comprising: an outwardly directed flange around each of first and second of said members so as to lie in side-by-side relationship, each said flange having an annular clamping face on the side thereof remote from the flange on the other flanged member with said clamping faces being coaxial and convergent outwardly from the axis of the connected members, an annular loading face on each of said first and second members and spaced from said clamping faces, at least one of said loading faces being tapered, corresponding opposing loading faces on the third said member respectively engaging the loading faces on said first and second members to thereby positively align and locate said members, said annular tapered loading face being provided on a section of one of said first and second members which extends in an axial direction from said flanges, said side-by-side flanges and a portion of said third member defining an annular space having a substantially triangular cross section between them and positioned between said loading faces and said clamping faces, a resilient joint ring compressed within said annular space, a clamping ring subdivided into two or more separated segments and having an inwardly facing annular groove with the sides thereof having annular faces matching the clamping faces on said flanges, said clamping ring being arranged with its sides straddling the two flanges and encircling said first and second members, and tangential bolts connecting said separated segments and contracting said clamping ring to thereby maintain said members in fluid tight relationship by means of the axial force exerted on the clamping faces of said flanges by the matching faces in said annular groove.

4. A fluid tight connection as claimed in claim 3 wherein the sides of said clamping ring segments have recesses therein thereby increasing the circumferential flexibility of said segments.

5. A fluid tight connection between three casing members of centrifugal pumps and the like which casing members have an axis, said connection comprising: an outwardly directed flange formed around each of first and second of said members so as to lie in side-by-side relationship, each said flange having an annular clamping face on the side thereof remote from the flange on the other flanged member with said clamping faces being coaxial and convergent outwardly from the axis of the connected members, an annular tapered loading face on a section of said first member which extends in the axial direction from said flanges, an annular radial loading face on said second member, said loading faces being spaced from said clamping faces, corresponding opposing loading faces on the third said member respectively engaging the loading faces on said first and second members to thereby positively align and locate said members, said side-by-side flanges and a portion of said third member defining an annular space having a substantially triangular cross section between them and positioned between said loading faces and said clamping faces, a resilient joint ring compressed within said annular space, a clamping ring subdivided into two or more separated segments and having an inwardly facing annular groove with the sides thereof having annular faces matching the clamping faces on said flanges, said clamping ring being arranged with its sides straddling the two flanges and encircling said first and second members, and tangential bolts connecting, said separated segments and circumferentially contracting said clamping ring to thereby maintain said members in fluid tight relationship by means of the axial force exerted on the clamping faces of said flanges by the matching faces in said annular groove.

6. A fluid tight connection as claimed in claim 5, wherein the sides of said clamping ring segments have recesses therein thereby increasing the circumferential flexibility of said segments.

References Cited

UNITED STATES PATENTS

| | | | |
|---|---|---|---|
| 2,269,664 | 1/1942 | Hallerberg | 285—367 X |
| 2,330,864 | 10/1943 | Bruno | 285—332.2 |
| 2,548,934 | 4/1951 | Beaird. | |
| 2,628,596 | 2/1953 | Bachle | 285—367 X |
| 2,661,965 | 12/1953 | Parmesan | 285—332.2 X |
| 3,010,172 | 11/1961 | Kaplan | 285—367 X |
| 3,077,360 | 2/1963 | Israel | 292—256.67 |
| 3,099,060 | 6/1963 | Smith | 285—367 X |

FOREIGN PATENTS

| | | |
|---|---|---|
| 996,675 | 12/1951 | France. |
| 886,133 | 1/1962 | Great Britain. |

CHARLIE T. MOON, *Primary Examiner.*

U.S. Cl. X.R.

29—157, 463; 285—367, 332.3; 292—256.67